(12) United States Patent
Nakashima

(10) Patent No.: US 10,931,840 B2
(45) Date of Patent: Feb. 23, 2021

(54) INFORMATION PROCESSING APPARATUS, CONTROL METHOD, AND STORAGE MEDIUM FOR DISPLAYING OPERATION BUTTONS CORRESPONDING TO OPERATIONS EXECUTED ON DOCUMENT DATA

(71) Applicant: CANON KABUSHIKI KAISHA, Tokyo (JP)

(72) Inventor: Kazuya Nakashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/429,645

(22) Filed: Jun. 3, 2019

(65) Prior Publication Data
US 2019/0379798 A1    Dec. 12, 2019

(30) Foreign Application Priority Data

Jun. 8, 2018    (JP) .............................. JP2018-110454

(51) Int. Cl.
*H04N 1/00*    (2006.01)

(52) U.S. Cl.
CPC ..... *H04N 1/00503* (2013.01); *H04N 1/00389* (2013.01); *H04N 1/00432* (2013.01); *H04N 1/00506* (2013.01)

(58) Field of Classification Search
CPC .......... H04N 1/00503; H04N 1/00506; H04N 1/00389; H04N 1/00432
See application file for complete search history.

(56) References Cited

U.S. PATENT DOCUMENTS

2004/0263869 A1* 12/2004 Kimura ................. G06F 3/1253
                                                            358/1.1
2016/0062575 A1*  3/2016 Yamamichi ........ H04N 1/00503
                                                            715/765

FOREIGN PATENT DOCUMENTS

JP    2016-045770 A    4/2016
JP    2016-103076 A    6/2016

* cited by examiner

*Primary Examiner* — Juan M Guillermety
(74) *Attorney, Agent, or Firm* — Canon U.S.A., Inc. IP Division

(57) ABSTRACT

In an information processing apparatus, in a case where between a timing when a user operation based on a first operation button is executed and a timing when a user operation based on a second operation button is executed, another user operation is executed on document data, a third operation button is added between the first and second operation buttons, and in a display area, a tab is displayed in a state where the third operation button is placed between the first and second operation buttons.

11 Claims, 16 Drawing Sheets

Do you add following button between [Receipt Stamp] and [Transmit Fax] in Fax Work A tab?

☑ Open Document
701

702 — Yes   No — 703

FIG.7B

Do you add following buttons between [Receipt Stamp] and [Transmit Fax] in Fax Work A tab?

☑ Open Document
☑ Erase Frame

Yes   No

FIG. 8A

```
<AddableList>
    <Button Function="open" Name="Open Document" />
    <Button Function="convertPDF" Name="PDF Conversion" />
    <Button Function="deletePage" Name="Delete Page" />
    <Button Function="rotatePage" Param="90" Name="Rotate Page" />
    <Button Function="deleteFrame" Name="Erase Frame" />
    ...
</AddableList>
```

```
<TabList>
    <Tab ID="Tab001" Name="Fax Work A">
        <Button ID="Button001" Name="Change Name" Function="rename" />
        <Button ID="Button002" Name="Receipt Stamp" Function="pushStamp" Param="stamp001" />
        <Button ID="Button003" Name="Transmit Fax" Function="sendFax" />
        <Button ID="Button004" Name="Save in Transmitted" Function="saveAs" Param="root¥Receive Fax¥Transmitted" />
    </Tab>
    <Tab ID="Tab002" Name="Fax Work B">
        <Button ID="Button005" Name="Delete Page" Function="deletePage" />
        <Button ID="Button006" Name="Receipt Stamp" Function="pushStamp" />
        <Button ID="Button007" Name="Transmit Fax" Function="sendFax" />
    </Tab>
</TabList>
```

| Date and Time | Function | ID | Tab ID | |
|---|---|---|---|---|
| 1/1 09:45:00 | copy | Button010 | — | ~905 |
| 1/1 10:00:00 | rename | Button001 | Tab001 | ~906 |
| 1/1 10:00:20 | pushStamp | Button002 | Tab001 | ~907 |
| 1/1 10:00:25 | open | — | — | ~908 |
| 1/1 10:00:40 | sendFax | Button003 | Tab001 | ~909 |

FIG.11

Do you also add same button between [Receipt Stamp] and [Transmit Fax] in Fax Work B tab?

1101 — Yes     No — 1102

1100

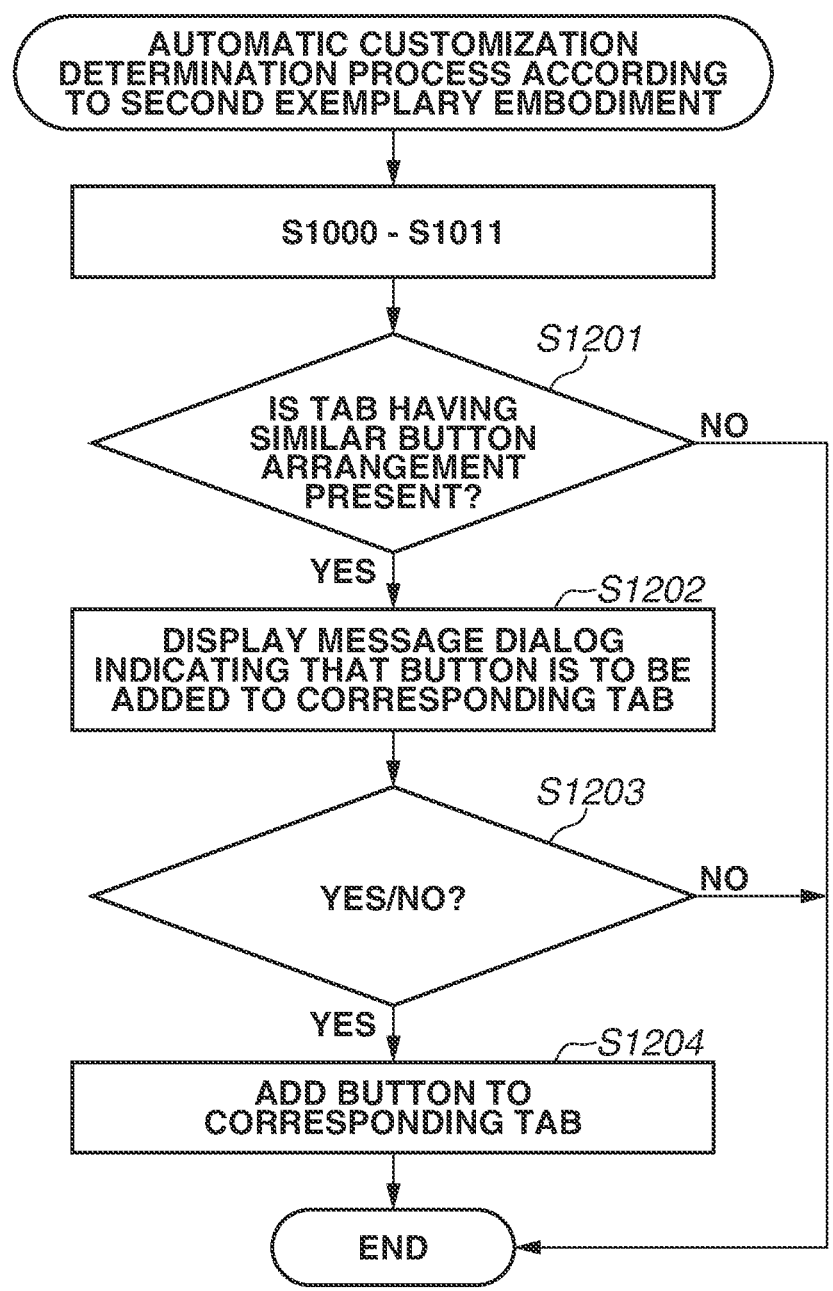

FIG.13A

Do you replicate Fax Work A tab and add following button between [Receipt Stamp] and [Transmit Fax] of replicated tab?

 Open Document

[ Yes ]    [ No ]

FIG.13B

Do you add following button between [Receipt Stamp] and [Transmit Fax] in Fax Work A tab?

 Open Document

1401
— Specifying of Addition Destination —
- ⦿ Add button to Fax Work A tab
- ○ Replicate Fax Work A tab and add button to replicated tab

1402

[ Yes ]    [ No ]

FIG.16

| Date and Time | Function | ID | Tab ID |
|---|---|---|---|
| 1/1 10:00:00 | rename | Button001 | Tab001 |
| 1/1 10:00:20 | pushStamp | Button002 | Tab001 |
| 1/1 10:00:25 | open | ----- | ----- |
| 1/1 10:00:40 | sendFax | Button003 | Tab001 |
| 1/1 10:01:50 | saveAs | Button004 | Tab001 |

INFORMATION PROCESSING APPARATUS, CONTROL METHOD, AND STORAGE MEDIUM FOR DISPLAYING OPERATION BUTTONS CORRESPONDING TO OPERATIONS EXECUTED ON DOCUMENT DATA

BACKGROUND OF THE INVENTION

Field of the Invention

The present disclosure relates to an information processing apparatus for presenting an operation on document data, a control method, and a storage medium.

Description of the Related Art

Among applications for executing a process on document data, there is an application that enables customization of a user interface (UI) based on settings made by a user. For example, the user can freely create a button corresponding to each process included in the application and place the button on a UI of the application. Further, there is also an application that enables placement of a plurality of created buttons in a tab similarly created by a user. A "tab" refers to a UI for switching a plurality of buttons that is being displayed to a plurality of other buttons so that the plurality of other buttons is displayed.

There is also a system where a button is created, and/or a tab in which a plurality of created buttons is placed is created, thereby improving work efficiency when a series of operations to be routinely performed is executed, or reducing work omissions. For example, suppose that there is routine work (fax order reception work) of putting a receipt stamp on an order form sent by fax and replying that the order is received. The routine work includes four operations, i.e., a "change name (document name)" operation, a "receipt stamp" operation, a "transmit fax" operation, and a "save in transmitted (folder)" operation, for the received fax document. A user proceeds with the work by pressing buttons corresponding to the respective operations placed in order. The plurality of work steps described above includes an operation requiring the user's approval or confirmation (e.g., the "receipt stamp" operation) and therefore is often executed manually, not fully automatically.

To make these manual operations more efficient and prevent operation omissions, Japanese Patent Application Laid-Open No. 2016-45770 discusses a system for placing a plurality of buttons corresponding to work steps in a single tab.

Further, Japanese Patent Application Laid-Open No. 2016-103076 discusses a customization screen where a control button to be placed in a tab is customized (added or deleted).

As a method of use, it is possible to add a button corresponding to a new operation to a plurality of buttons for which a series of operations is defined in order and which is placed in a tab. In the above example, a button corresponding to an "open document" operation, which is a new operation, is added between a button corresponding to the "receipt stamp" operation and a button corresponding to the "transmit fax" operation.

Before the routine work is started, i.e., before the user performs the operations, a method for editing a button to be placed in a tab through a customization screen as illustrated in Japanese Patent Application Laid-Open No. 2016-103076 is suitable. However, the method is inappropriate while or after the user executes the operations. This is because the user already performs the series of operations including the new operation once and clearly specifies operations that will be required in the future to the system. Thus, to edit the button through the customization screen is to clearly specify the new operation to the system again, which is duplication of effort for the user.

SUMMARY OF THE INVENTION

A mechanism for, by a more convenient method, enabling provision of a tab to which a button corresponding to a new operation is added is desired. Embodiments of the present disclosure relate to, in a part of the process of executing a series of operations on document data using a tab in which a plurality of buttons corresponding to operations is placed, adding a new button to the tab or generating a new tab to which a new button is added.

According to some embodiments of the present disclosure, an information processing apparatus includes one or more processors, and at least one memory storing executable instructions, which when executed by the one or more processors, cause the information processing apparatus to display a display area where a plurality of operation buttons corresponding to user operations to be executed on document data is displayed, the plurality of operation buttons being placed in a tab displayed in the display area according to an order determined in advance, and the display area being displayed based on the tab being selected, thereby enabling switching to a state where the plurality of operation buttons is displayed, wherein in a case where between a timing when a user operation based on a first operation button included in the plurality of operation buttons is executed and a timing when a user operation based on a second operation button included in the plurality of operation buttons is executed, another user operation is executed on the document data, a third operation button corresponding to the another user operation is added between the first and second operation buttons, and wherein in the display area, the tab in which the plurality of operation buttons and the third operation button are displayed next to each other, or a new tab is displayed in a state where the third operation button is placed between the first and second operation buttons.

Further features of the present disclosure will become apparent from the following description of exemplary embodiments with reference to the attached drawings.

BRIEF DESCRIPTION OF THE DRAWINGS

FIGS. 7A and 7B are diagrams illustrating examples of a message dialog according to the first exemplary embodiment.

FIGS. 8A and 8B are diagrams illustrating examples of addable button information and tab setting information regarding the document management application.

FIG. 9 is a diagram illustrating an example of operation history information regarding the document management application.

FIG. 11 is a diagram illustrating an example of a message dialog according to a second exemplary embodiment.

FIG. 12 is a flowchart regarding automatic customization determination according to the second exemplary embodiment.

FIGS. 13A and 13B are diagrams illustrating examples of a message dialog.

FIG. 16 is a diagram illustrating an example of operation history information regarding a document management application.

DESCRIPTION OF THE EMBODIMENTS

Figure 1:
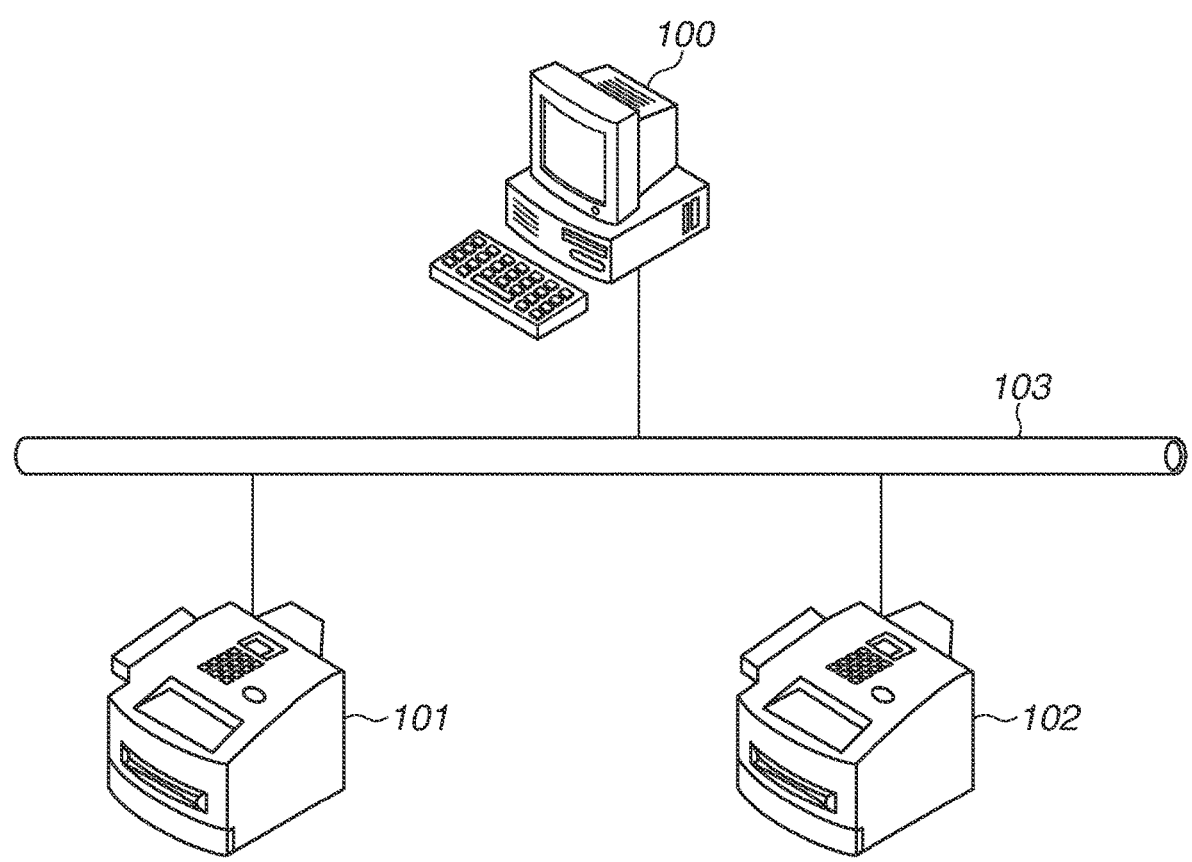
FIG. 1 is a diagram illustrating a configuration of a system.

With reference to the drawings, a first exemplary embodiment will be described below.
[System Configuration]
FIG. 1 is a diagram illustrating the configuration of a data processing system according to the first exemplary embodiment of the present disclosure.

The present exemplary embodiment is a system where an information processing apparatus 100 and image processing apparatuses 101 and 102 can communicate with each other via a network. The information processing apparatus 100 instructs the image processing apparatuses 101 and 102 to perform printing or transmit fax. Specifically, the information processing apparatus 100 is a personal computer (PC). Each of the image processing apparatuses 101 and 102 has a printer function, a fax function, a copy function, a scanner function, and a file transmission function. Although FIG. 1 illustrates a form in which there are two image processing apparatuses, the number of image processing apparatuses does not particularly matter in the present exemplary embodiment. Similar processes and functions executed by the image processing apparatuses 101 and 102 are described using the image processing apparatus 101 on behalf of the image processing apparatuses 101 and 102.

Figure 2:
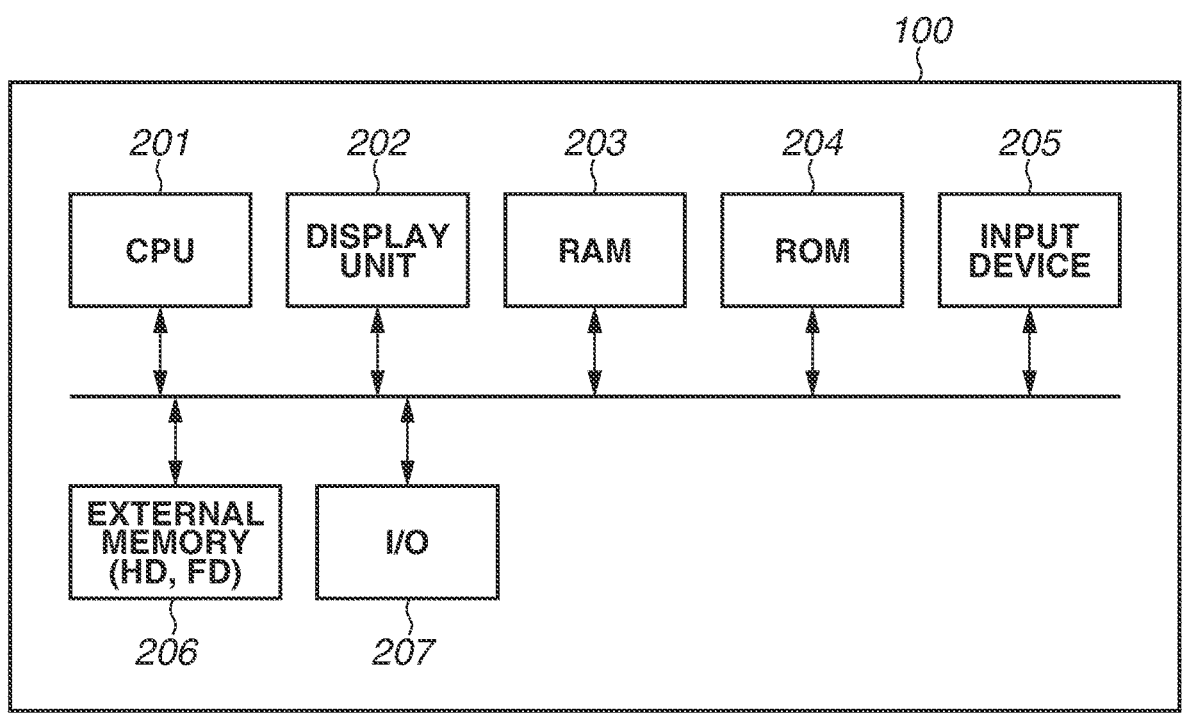
FIG. 2 is a diagram illustrating a hardware configuration of an information processing apparatus.
Figure 3:
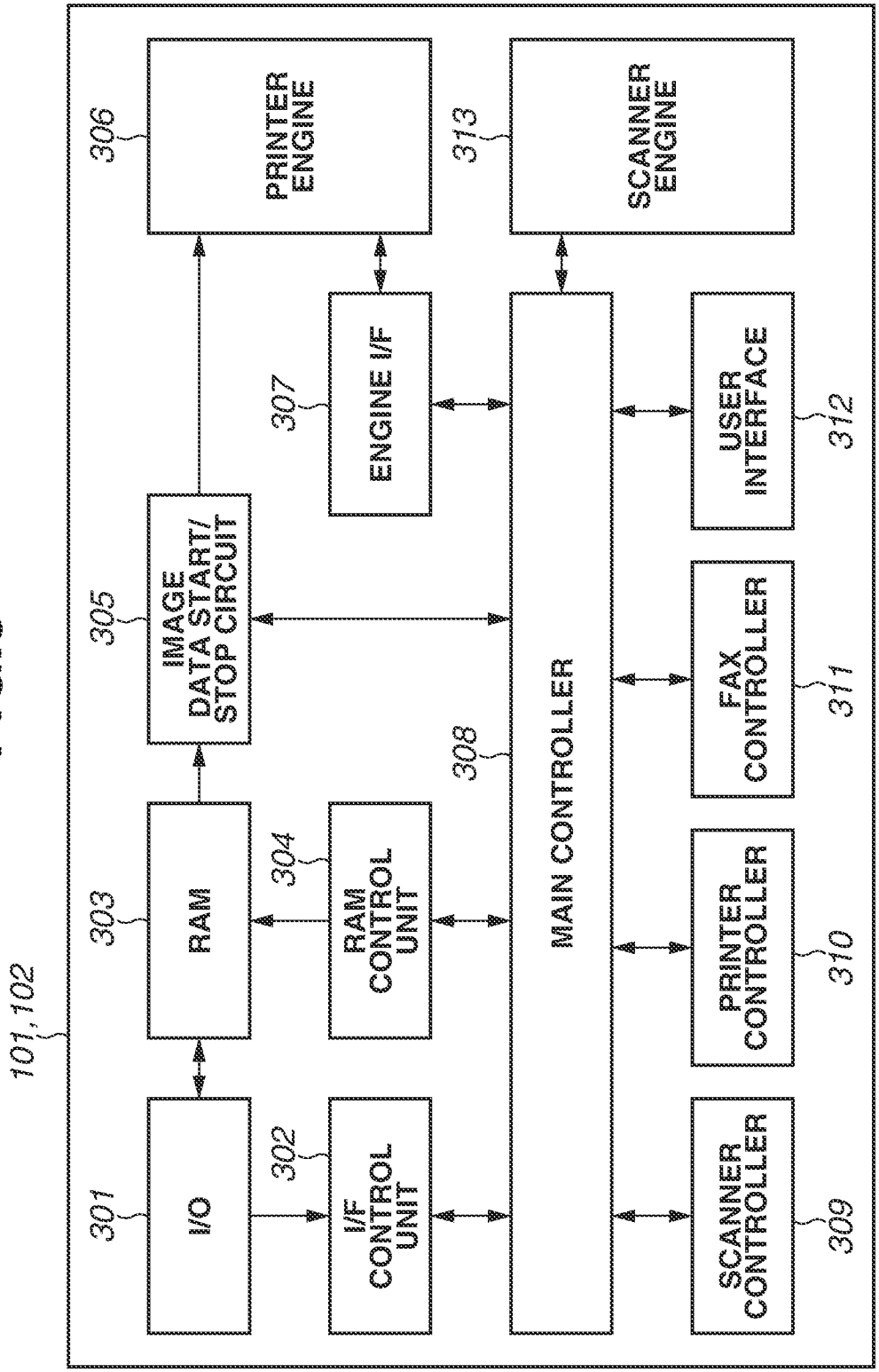
FIG. 3 is a diagram illustrating a hardware configuration of an image processing apparatus.

A predetermined operating system (OS) and various applications (not illustrated) for executing particular functional processes are installed on the information processing apparatus 100. The particular functional processes include document processing, spreadsheet processing, presentation processing, image processing, and graphics processing. Each application has a unique data structure (file structure). The OS is configured to, with reference to the identifier of each file, give a print instruction to a corresponding application. Further, a document management application 400 for using the image processing apparatus 101 is installed on the information processing apparatus 100 according to the present exemplary embodiment. The document management application 400 has the function of giving the image processing apparatus 101 an output instruction to perform printing or transmit fax, and the function of displaying the use state of the image processing apparatus 101 and the execution status of an output job. A local area network (LAN) 103 is connected to the apparatuses, and the apparatuses communicate with each other via the LAN 103.
[Hardware Configuration (Information Processing Apparatus 100)]
FIG. 2 is a diagram illustrating the hardware configuration of the information processing apparatus 100 illustrated in FIG. 1. In FIG. 2, the information processing apparatus 100 includes an input device 205, such as a keyboard and a pointing device, that receives the input of a user operation. Further, the information processing apparatus 100 includes a display unit 202 that feeds back visual output information to the user. Further, the information processing apparatus 100 includes a random-access memory (RAM) 203 that is a storage device for storing various programs and execution information in the present exemplary embodiment, an external memory 206 such as a hard disk drive (HDD) or a flexible disk drive (FDD), and a read-only memory (ROM) 204. Further, the information processing apparatus 100 includes an input/output (I/O) 207 that is an interface device for communicating with an external device, and a central processing unit (CPU) 201 that executes a program. It does not matter whether the connection form with a peripheral device is wired or wireless. The information processing apparatus 100 connects to the image processing apparatus 101 or 102 via the external device connection interface (I/F), i.e., the I/O 207.
[Hardware Configuration (Image Processing Apparatus 101 or 102)]
FIG. 3 is a block diagram illustrating the hardware configuration of the image processing apparatus 101 or 102. The present exemplary embodiment illustrates an example of a multi-function peripheral (MFP) having a scanner function, a printer function, and a fax function.

An I/O 301 is connected to the information processing apparatus 100 via a communication medium such as the network (LAN) 103. To be compatible with a plurality of connection forms, a plurality of I/Os 301 may be provided. The image processing apparatus 101 transmits a device identification (ID) or a scan image to the information processing apparatus 100 via the I/O 301. Further, the image processing apparatus 101 receives various control commands from the information processing apparatus 100 via the I/O 301 and performs processing. An I/F control unit 302 performs control to issue a device ID regarding a processing system such as a scanner (not illustrated), a printer (not illustrated), or fax (not illustrated) provided in the image processing apparatus 101.

A RAM 303 is a primary storage device and is used to store external data such as a control command acquired via the I/O 301 or an image read by a scantier engine 313. Further, the RAM 303 is also used to store an image converted by a printer controller 310 before being transmitted to a printer engine 306. A RAM control unit 304 manages an assignment to the RAM 303.

An image data start/stop circuit 305 is a device for, based on the rotation of the printer engine 306, outputting an image captured by the printer controller 310 or the scanner engine 313 and converted by the RAM control unit 304. The printer engine 306 is a device for developing an image on an output medium such as paper.

A main controller 308 performs various types of control of the printer engine 306 via an engine I/F 307. For example, the main controller 308 performs a process for appropriately distributing control languages received from the information processing apparatus 100 via the I/O 301 to a scanner controller 309, the printer controller 310, and a fax controller 311. Further, the main controller 308 receives an instruction from each of the controllers or a user interface (UI) 312 and controls the printer engine 306 or the scanner engine 313.

The main controller 308 uses the same control interface among various controllers, whereby an extension board capable of processing a plurality of types of control commands can be provided in a single peripheral device. Further, the main controller 308 also acquires from each controller the device ID of an extension controller currently provided in the controller and manages the acquired device ID.

The scanner controller 309 breaks down a scan control command received from the information processing apparatus 100 into an internal execution command that can be interpreted by the main controller 308. Further, the scanner controller 309 changes an image read by the scanner engine 313 to a scan control command. The printer controller 310 breaks down a page description language received from the information processing apparatus 100 into an internal execution command including a converted image in a page description language that can be interpreted by the main controller 308. The converted image is transmitted to the printer engine 306 and printed on an output medium such as a sheet.

The fax controller 1 converts a fax control language received from the information processing apparatus 100 into an image and transfers the image to another fax apparatus or Internet Protocol (IP) fax via a public line (not illustrated) or the Internet. The UI 312 is used as a unit for inputting and outputting various settings of the main controller 308, and an instruction from the user when the image processing apparatus 101 directly executes the scanner function, the printer function, or the fax function. The scanner engine 313 reads an image printed using an optical device according to an instruction from the main controller 308, converts the image into an electric signal, and transmits the electric signal to the main controller 308.

[Software Configuration Diagram]

Figure 4:
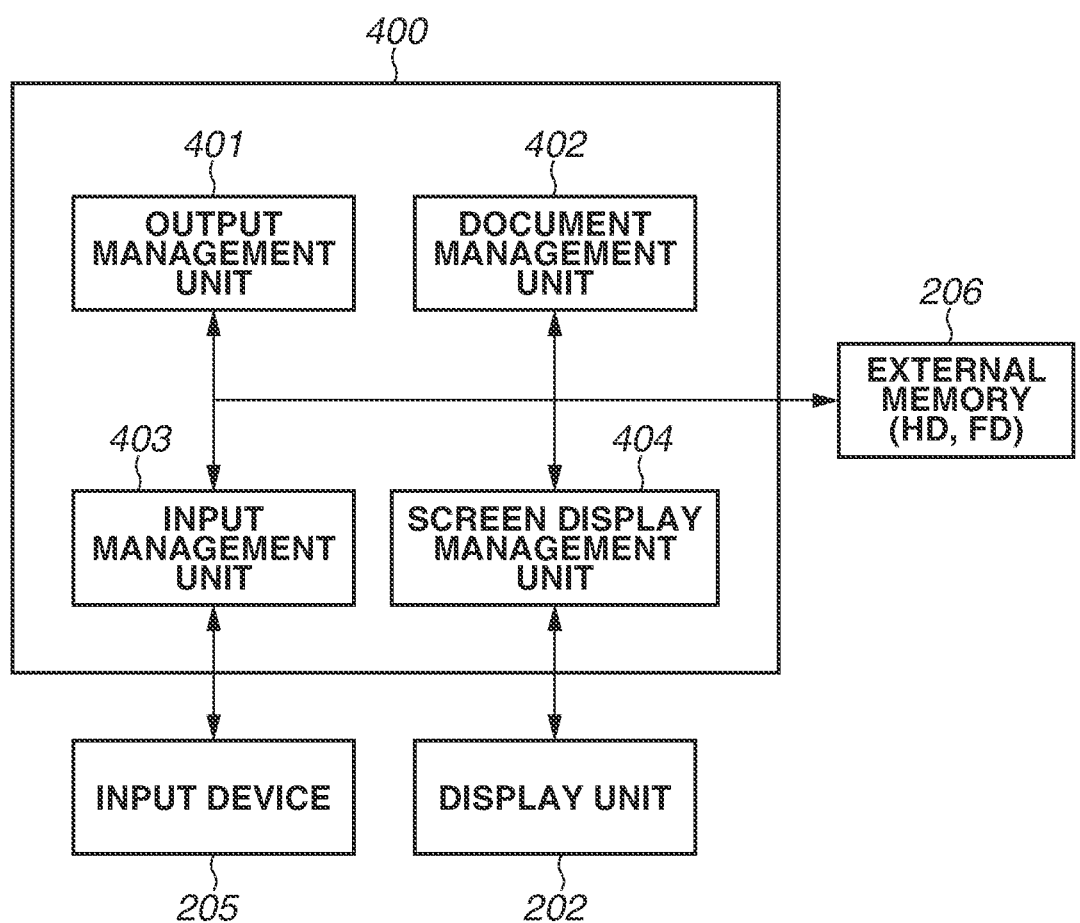
FIG. 4 is a diagram illustrating a software configuration of a document management application.

FIG. 4 is a diagram illustrating an example of the functional configuration of the document management application 400 of the information processing apparatus 100. The document management application 400 is stored in the external memory 206, is loaded into the RAM 203 and the ROM 204 when a document editing system is executed, and operates by the CPU 201 performing a calculation process.

The document management application 400 includes an output management unit 401, a document management unit 402, an input management unit 403, and a screen display management unit 404. The output management unit 401 outputs document data managed by the document management unit 402 to the image processing apparatus 101. The specific content of the output process includes a printing process in which printing is performed on a sheet through the printer controller 310, and a fax transmission process in which fax is transmitted through the fax controller 311.

The document management unit 402 manages document information (document data and the properties of the document data). Through a UI (a graphical UI) of the document management application 400 displayed by the screen display management unit 404, the input management unit 403 detects an operation of the user on the input device 205 and acquires operation information regarding the operation of the user. Further, the input management unit 403 also manages operation history information 900 regarding the document management application 400. The operation history information 900 is information including the processing content of processing executed on document data by the user, and the date and time when the processing is executed.

The details of the operation history information 900 will be described below with reference to FIG. 9.

Furthermore, the input management unit 403 also performs an input process through the image processing apparatus 101. Specifically, in the input process, a sheet is scanned through the scanner controller 309.

The screen display management unit 404 performs screen display control of the display of the UI of the document management application 400. Further, the screen display management 404 also manages addable button information 800 and tab setting information 806 regarding the document management application 400. The addable button information 800 is information regarding a button that can be added to a tab, and the tab setting information 806 is information regarding a button placed in a tab. The details of the addable button information 800 and the tab setting information 806 will be described below with reference to FIGS. 8A and 8B.

[Display Screen of Document Management Application]

Figure 5A:
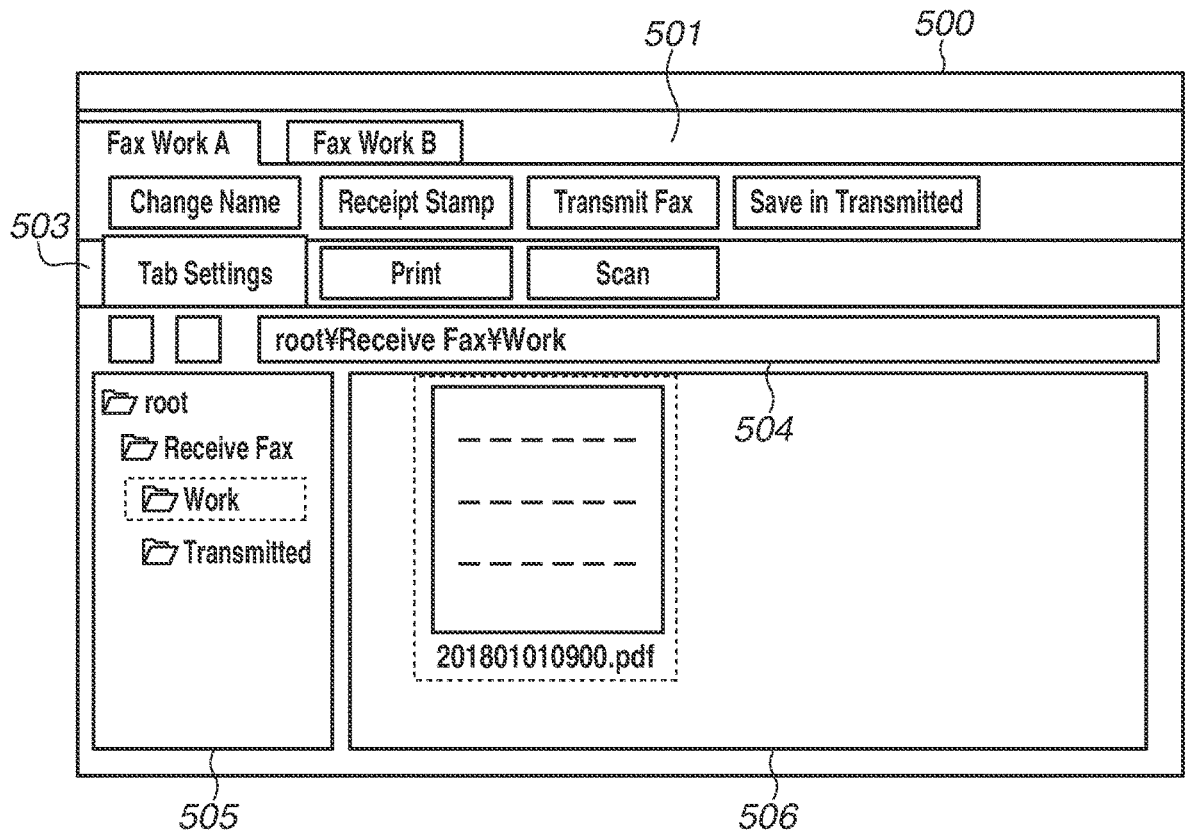
FIGS. 5A and 5B are diagrams illustrating examples of display of a user interface (UI) of a document management application according to a first exemplary embodiment.
Figure 5B:
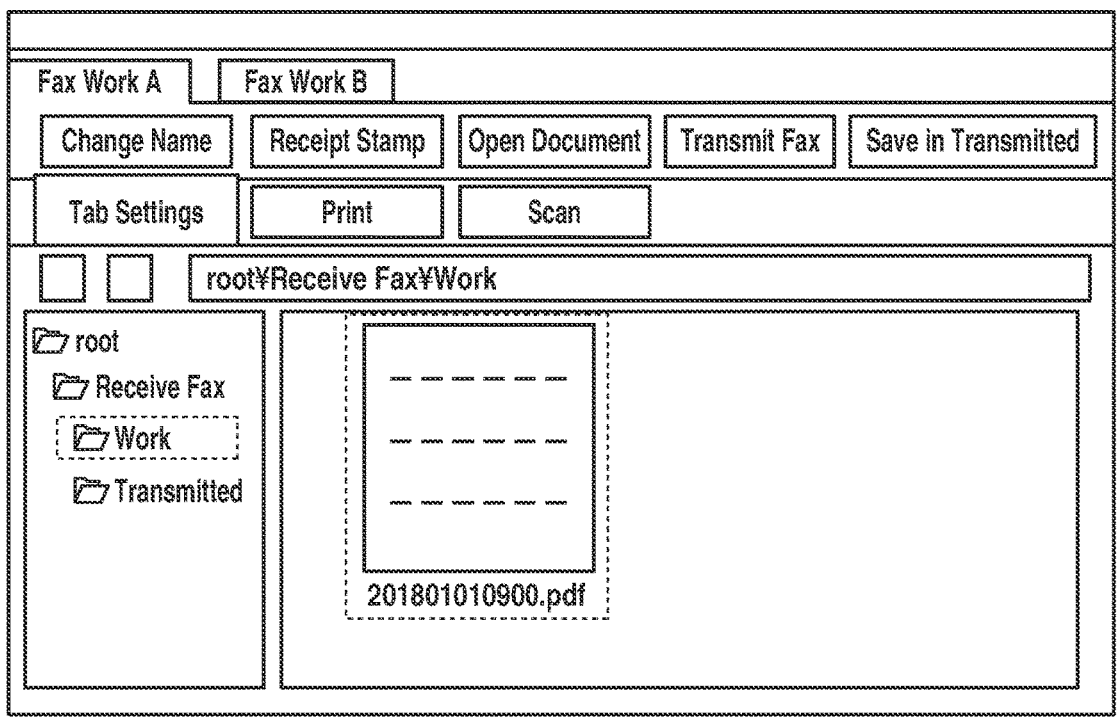

FIGS. 5A and 5B are diagrams schematically illustrating a display screen 500 of the document management application 400.

In a tab list 501, a single tab or a plurality of tabs is displayed. If the user selects one of the plurality of tabs, a list of operation buttons (hereinafter, "buttons") placed in the sheet of selected tab is displayed. The example of FIG. 5A illustrates the state where two tabs, i.e., a "fax work A" tab and a "fax work B" tab, are displayed in the tab list 501, and the "fax work A" tab is selected by the user. Then, it is understood from FIG. 5A that four buttons, i.e., a "change name" button, a "receipt stamp" button, a "transmit fax" button, and a "save in transmitted" button, are placed in the "fax work A" tab. On the other hand, in FIG. 5B, five buttons, i.e., the "change name" button, the "receipt stamp" button, an "open document" button, the "transmit fax" button, and the "save in transmitted" button, are placed in the "fax work A" tab.

Although the present exemplary embodiment is described using as examples the buttons displayed in FIGS. 5A and 5B, the order of buttons, the processing contents corresponding to buttons, and the number of buttons are not limited to these. As described above, a "tab" is a UI for switching a plurality of buttons that is being displayed to a plurality of other buttons so that the plurality of other buttons is displayed. In the example of FIG. 5A, by selecting the "fax work A" tab, the plurality of buttons placed in the "fax work A" tab can be brought into display states. The same applies to a case where the "fax work B" tab is selected.

The functions of the buttons are described. A process corresponding to each button is executed by selecting document data as a processing target and pressing the button. If the "change name" button is pressed, the document name of the selected document data can be changed. At this time, the document name may be changed by displaying a dialog for inputting a name and by allowing the user to input a name. Alternatively, the document name may be automatically changed to a character string set in advance.

If the "receipt stamp" button is pressed, a receipt stamp can be inserted into the selected document data. At this time, the user may be allowed to specify the position where the receipt stamp is put. Alternatively, the receipt stamp may be automatically inserted at a position set in advance.

If the "open document" button is pressed, the document data can be opened using an application related to the format (Portable Document Format (PDF) or Word) of the document data.

If the "transmit fax" button is pressed, the selected document data can be transmitted to the image processing apparatus 101 and transmitted by fax to a specified destination. As a method for specifying the destination, the destination may be able to be specified when the "transmit fax" button is pressed. Alternatively, a form may be employed in which the selected document data is automatically transmitted to a destination registered in advance.

If the "save in transmitted" button is pressed, the selected document data can be saved in a "transmitted" folder set in advance. A folder as a save location may be able to be specified when the "save in transmitted" button is pressed.

In a toolbar 503, buttons that are not placed in the tabs are displayed. The example of FIG. 5A illustrates the state where three buttons, i.e. a "tab settings" button, a "print" button, and a "scan" button, are arranged. If the "tab settings" button is pressed, the document management application 400 displays a dialog (FIG. 6) for making a custom setting of a tab, and a custom setting of a tab in the tab list 501 can be made. Specifically, a "custom setting" refers to the process of adding or deleting a tab, and the process of adding a button to a tab or deleting a button from a tab.

If the "print" button is pressed, the selected document data can be transmitted to the image processing apparatus 101, and the image processing apparatus 101 can be caused to print the selected document data. If the "scan" button is pressed, document data acquired by a scanning process in the image processing apparatus 101 can be displayed in a file display area 506. The acquired document data is managed by the document management unit 402.

An address bar 504 is an area where the folder path of a folder managed by the document management unit 402 of the document management application 400 is displayed. Specifically, a folder path indicating a folder selected in a folder tree display area 505 is displayed. The example of FIG. 5A illustrates the state where document data "201801010900.pdf" stored at a folder path "root\Receive Fax \Work" is displayed.

The folder tree display area 505 is an area where the hierarchical structure of folders managed by the document management unit 402 of the document management application 400 is displayed as a tree. The example of FIG. 5A illustrates the state where a "work" folder in a "receive fax" folder is selected (highlighted by a dotted box).

The file display area 506 is an area where document data in a folder managed by the document management unit 402 of the document management application 400 is displayed. Document data stored in a folder selected in the folder tree display area 505 is displayed. The example of FIG. 5A illustrates the state where the document data "201804010900.pdf" stored in the folder at "root\Receive Fax\Work" is displayed as a thumbnail.

[Custom Setting]

Figure 6:
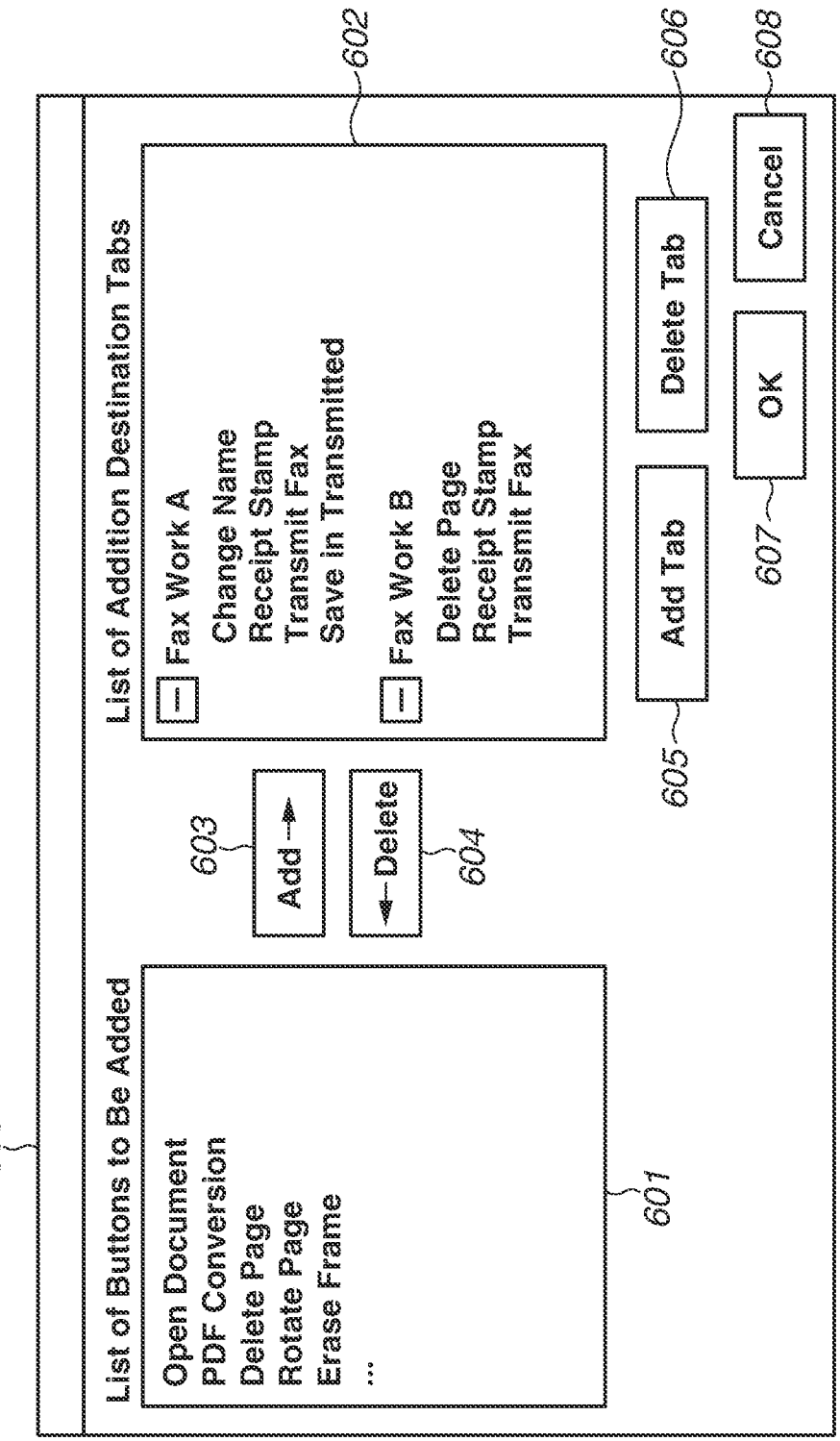
FIG. 6 is a diagram illustrating an example of display of a dialog for making a custom setting of a tab of the document management application.

FIG. 6 is a diagram illustrating an example of the display of a custom setting dialog 600 for making a custom setting of a tab of the document management application 400. In the custom setting dialog 600, a tab can be added or deleted, and a button can be added to or deleted from a tab. The content set in the custom setting dialog 600 is reflected on the tab list 501.

In a button list 601, buttons that can be added to a tab are displayed as a list. The buttons are displayed based on the addable button information 800 managed by the screen display management unit 404. In a tab list 602, a list of tabs that are the addition destinations of buttons and are displayed in the tab list 501, and a list of buttons placed in each of the tabs are displayed based on the tab setting information 806 managed by the screen display management unit 404. In the example of FIG. 6, the buttons included in the "fax work A" tab and the "fax work B" tab in the tab list 501 in FIG. 5A are displayed.

To add a button to a tab, the user selects any button from the button list 601, selects any tab from the tab list 602, and then presses an "add" button 603. As a result, the selected button is added to the selected tab. At this time, the button is added to the end of the buttons in the selected tab. On the other hand, if not a tab but a button in the addition destination tab list 602 is selected before the "add" button 603 is pressed, the button selected from the button list 601 is added after the button selected in the addition destination tab list 602.

When the button is added, the user may be allowed to edit a name to be displayed for the button. Further, if a parameter is required for the process of the button to be added, the user may be allowed to input the parameter when the button is added. Examples of a parameter that can be set when a "rotate page" button is added include a rotational angle.

To delete a button from a tab, the user selects any button from the addition destination tab list 602 and presses a "delete" button 604. In this manner, the selected button can be deleted from the tab.

If an "add tab" button 605 is pressed, a new tab is added to the addition destination tab list 602. The added tab is reflected on the tab list 501. If no tab is selected in the tab list 602, the new tab is added to the end of the tab list 602. If a specific tab is in a selected state in the tab list 602, the new tab is added after the specific tab. When the tab is added, the name of the new tab is edited.

If any tab is selected from the tab list 602, and a "delete tab" button 606 is pressed, the selected tab is deleted. If an "OK" button 607 is pressed, the display screen 500 on which the settings made in the custom setting dialog 600 are reflected is displayed. On the other hand, if a "cancel" button 608 is pressed, the addition or deletion of a button or the addition or deletion of a tab set in the custom setting dialog 600 is not applied to the display screen 500, and the custom setting dialog 600 closes.

[Addable Button Information and Tab Setting Information]

FIGS. 8A and 8B are diagrams illustrating examples of information regarding a custom setting of a tab of the document management application 400. The addable button information 800 in FIG. 8A is information regarding a button that can be added to a tab. The content described in the addable button information 800 corresponds to the display content of the button list 601 of the custom setting dialog 600.

An addable list information tag 801 is a tag for managing a list of buttons to be added. Button information surrounded by the addable list information tag 801 indicates a button that can be added to a tab. A button information tag 802 indicates information regarding a button to be placed in a tab. A function element 803 indicates the process of a button to be placed in a tab.

A parameter element 804 indicates a parameter transmitted when the process corresponding to the function element 803 is executed. For example, if the value of the function element 803 is "rotatePage" (a page rotation process), the rotational angle of rotation display of selected document data can be specified using the parameter element 804. If the value of the parameter element 804 is "90", the selected document data is rotated to the right by 90 degrees. Some process of the function element 803 does not require a parameter. In this case, the parameter element 803 may not need to be included. A name element 805 indicates the display name of a button.

The tab setting information 806 is information for displaying the tab list 501 of the document management application 400. The example of FIG. 8B illustrates information regarding the tabs (the "fax work A" tab and the "fax work B" tab) displayed in the tab list 501 in FIG. 5A.

A tab group surrounded by tab list information 807 indicates the tabs included in the tab list 501 and the buttons in the tabs. Tab information 808 indicates a single tab in the tab list 501.

The tab information 808 managed in the tab list information 807 includes an ID element 809 and a name element 811. The name element 811 indicates the display name of a tab included in the tab list 501. A button information tag 812 indicates information regarding a button displayed in a tab and includes the ID element 809, the name element 811, a function element 813, and a parameter element 814.

The ID element 809 indicates an ID enabling unique identification of a tab. If the "add tab" button 605 is pressed, a tab to be added is assigned an ID that does not have the same value as the ID of an existing tab. The same applies to the ID of a button when the "add" button 603 is pressed. In the examples of FIGS. 8A and 8B, a unique ID (ButtonID) is assigned to a button included in each of the two tabs.

For example, the "fax work A" tab and the "fax work B" tab commonly include the "receipt stamp" button, but the "receipt stamp" button in the "fax work A" tab and the "receipt stamp" button in the "fax work B" tab are assigned different IDs "Button002" and "Button006", respectively. Button IDs and tab IDs do not need to be consecutive numbers, but only need to be IDs distinguishable from each other. That is, even if a new button is added to the "fax work A" tab by processing described below, the button ID of the new button may or may not be an ID "Button ID="Button008"" that follows an ID "Button ID="Button007"".

[Operation History Information]

FIG. 9 is a diagram illustrating an example of the operation history information 900 regarding the document management application 400. The operation history information 900 indicates operation history information when the user performs an operation using the document management application 400. The example of FIG. 9 illustrates operation histories in the time period from "1/1 09:45:00" to "1/1 10:00:40" and indicates that processes are executed in the order of "copy" (print), "rename" (change name), "push-Stamp" (receipt stamp), "open" (open document), and "sendFax" (transmit fax).

The operation history information 900 includes a "date and time" column 901 that indicates the date and time when the user executes a process, a "fun ion" column 902 that indicates the executed process, an "ID" column 903 that indicates the ID of a button pressed by the user, and a "tab ID" column 904 that indicates the ID of a tab to which the pressed button belongs. For example, operation history information "IR 10:00:00 rename Button001 Tab001" indicates that the user executes the process of pressing the "change name" button in the "fax work A" tab at "1/1 10:00:00".

The operation history information 900 also includes operation information that does not involve the pressing of a button in a tab. For example, operation history information "1/1 10:00:25 open - -" (908) indicates that the user executes an "open document" operation at "1/1 10:00:25". However, since the ID and the tab ID have no values ("-": blank), it is understood that this process is not a process executed by pressing the "open document" button. Specific examples of the case where the "open document" operation is executed without pressing the button include a method in which the user directly executes an operation (a double click) on the document data.

Operation history information "1/1 9:45:00 copy Button010-" (905) indicates that the user executes a "print" operation at "1/1 9:45:00". However, since the tab ID has no value, it is understood that this operation is not an operation performed by pressing the button placed in a tab, but an operation executed by pressing the "print" button in the toolbar 503.

Although the present exemplary embodiment is described using as an example a button belonging to a tab, not all buttons necessarily belong to a tab. In this case, there is also a situation where, as in the operation history information 905, the tab ID is blank, and the "ID" is set to an ID "Button010" for uniquely identifying a button. Possible examples of a button that does not belong to a tab include a button displayed in the toolbar 503 and a button displayed in a menu bar (not illustrated).

[Flow Regarding Automatic Customization Determination]

Figure 10:
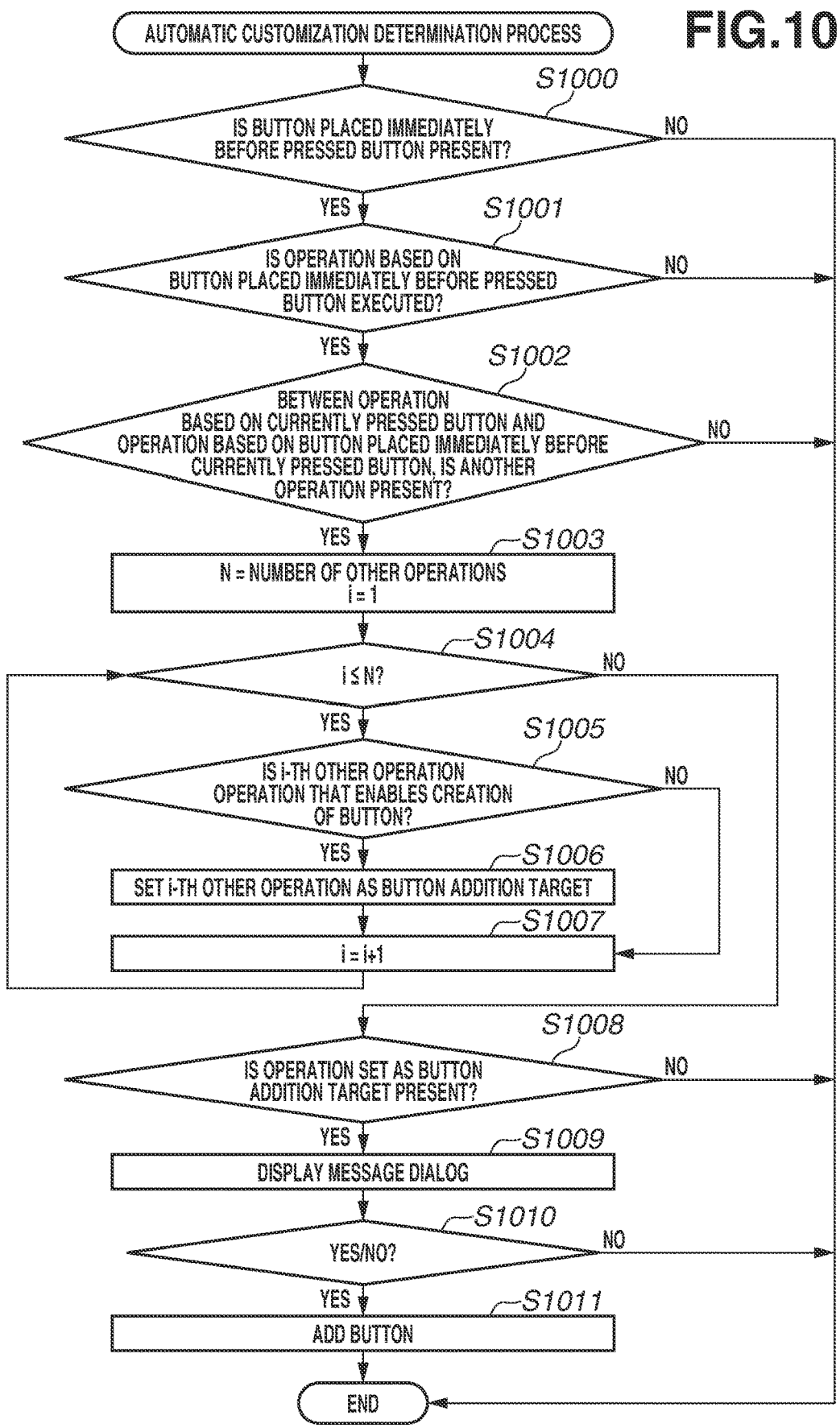
FIG. 10 is a flowchart regarding automatic customization determination according to the first exemplary embodiment.

With reference to FIG. 10, a description is given of a flow regarding automatic customization determination when a button is pressed in the first exemplary embodiment. The flow is executed using as a trigger the pressing of a button placed in a tab in the tab list 501 of the document management application 400.

First, in step S1000, the document management application 400 determines whether a button placed immediately before the pressed button is present. The determination is made with reference to the operation history information 900 (FIG. 9). The document management application 400 identifies the ID of the currently pressed button and the tab ID from the operation history information 900 and further references the tab setting information 806, and thereby can confirm whether another button is present immediately before the currently pressed button.

For example, if the "transmit fax" button in the "fax work A" tab is pressed, the operation corresponds to operation history information "1/1 10:00:40 sendFax Button003 Tab001" (909). Based on the fact that the value of the "tab ID" column 904 of the process is "Tab001", and the value of the "ID" column 903 of the process is "Button003", and with reference to the tab setting information 806, it is understood that the pressed button corresponds to information 810 in the tab setting information 806. Then, "Button002" (815) is present immediately before the information 810 in the tab setting information 806. Thus, in step S1000, it is determined that "a button placed immediately before the pressed button is present" (YES in step S1000).

If it is determined in step S1000 that a button placed immediately before the pressed button is not present (NO in step S1000), a button is not automatically customized, and the flow ends. Examples of the case where it is determined in step S1000 that the corresponding button is not present include a case where a button placed at the beginning of a tab, such as "Button001", is pressed (906), a case where a button that does not belong to a tab is pressed (905), and a case where the executed operation is not an operation executed by pressing a button (908).

In step S1001, the document management application 400 determines whether an operation based on the button located immediately before the pressed button and identified in step S1000 is executed. Specifically, with reference to the operation history information 900, it is determined whether the operation based on the button immediately before the pressed button and identified in step S1001 is executed. In this example, an operation based on a button "Button002"

(907) located immediately before a currently pressed button "Button003" (909) is executed before the currently pressed button "Button003" (909). Thus, it is determined in step S1001 that "the operation is executed" (YES in step S1001). If it is determined that the operation is not executed (NO in step S1001), the flow ends.

In step S1002, the document management application 400 determines whether between an operation based on the currently pressed button and an operation based on the button placed immediately before the currently pressed button, another operation is present. At this time, it does not matter whether another operation present between the operations based on these buttons is an operation based on a button, and to which tab the button belongs. With reference to the operation history information 900, it is determined whether another operation is present.

In this example, based on the operation history information 900, an operation corresponding to "1/1 10:00:25 open" (908) is present between the currently pressed button "Button003" (909) and the button "Button002" (907) immediately before the currently pressed button. Thus, it is determined in step S1002 that "another Operation is present" (YES in step S1002). If, on the other hand, another operation is not present (NO in step S1002), the flow ends.

In step S1003, the document management application 400 substitutes the number of operations between the current button operation and the button operation immediately before the current button operation for a variable N and substitutes 1 for a variable i. i is a variable indicating the i-th other operation between the current button operation and the button operation immediately before the current button operation.

In step S1004, the document management application 400 determines whether the variable i is less than or equal to the variable N. If it is determined that the variable i is less than or equal to the variable N (YES in step S1004), the processing proceeds to step S1005. If not (NO in step S1004), the processing proceeds to step S1008.

In step S1005, the document management application 400 determines whether the i-th other operation between the current button operation and the button operation immediately before the current button operation is an operation that enables creation of a button. Specifically, the determination is made based on whether a process corresponding to the other operation is present in the button information tag 802 managed in the addable button information 800. In this example, the operation determined as another operation in step S1002 is "open" (open document) and corresponds to "<Button Function="open" Name="Open Document"/>" in the addable button information 800. Thus, it is determined in step S1005 that "the i-th other operation is an operation that enables creation of a button" (YES in step S1005). If it is determined that the i-th other operation is not an operation that enables creation of a button (NO in step S1005), the processing proceeds to step S1007.

In step S1006, the document management application 400 sets the i-th other operation as a button addition target. The setting of an operation as a button addition target refers to the setting of the corresponding operation as a target to be displayed in a message dialog. After the flow in FIG. 10 is executed for all the N other operations, all the operations set as button addition targets are displayed in the message dialog.

FIGS. 7A and 7B illustrate examples of a message dialog 700. FIG. 7A is an example of the message dialog 700 when a single button is added. FIG. 7B is an example of the message dialog 700 when a plurality of buttons is added.

FIG. 7A illustrates a display state in a case where the "open document" operation is executed between operations based on the "receipt stamp" button and the "transmit fax" button arranged in the "fax work A" tab. FIG. 7B illustrates a display state in a case where the "open document" operation and an "erase frame" operation are executed between the operations based on the "receipt stamp" button and the "transmit fax" button arranged in the "fax work A" tab.

If a "yes" button 702 is pressed in the state where a checkbox 701 is checked, the checked button is added to the tab. In the example of FIG. 7A, the "open document" button is added between the "receipt stamp" button and the "transmit fax" button in the "fax work A" tab. In the example of FIG. 7B, the "open document" button and the "erase frame" button are added between the "receipt stamp" button and the "transmit fax" button in the "fax work A" tab. If, on the other hand, a "no" button 703 is pressed, a button addition process is not executed, and the message dialog 700 closes.

As illustrated in FIG. 7A, a form has been illustrated in which a checkbox is displayed also in a case where a single button is an addition candidate (701). Alternatively, a form may be employed in which a checkbox may not be displayed in a case where a single button is an addition candidate, and checkboxes are displayed only in a case where a plurality of buttons is addition candidates as in FIG. 7B.

The description returns to FIG. 10. After setting the i-th other operation as a button addition target in step S1006, then in step S1007, the document management application 400 adds 1 to the variable i, and the processing returns to step S1004. As a result of the processing returning from step S1007 to step S1004, if only one other operation is executed between the currently pressed button and the button placed immediately before the currently pressed button, and the determination is "NO" in step S1004, the processing proceeds to step S1008. If a plurality of other operations is present (YES in step S1004), the processes of steps S1004 to S1007 are repeated multiple times.

In step S1008, the document management application 400 determines whether an operation set as a button addition target is present. Specifically, it is determined whether an operation set as a button addition target by the process of step S1006 is present. If it is determined that an operation set as a button addition target is present (YES in step S1008), the processing proceeds to step S1009. If it is determined that an operation set as a button addition target is not present (NO in step S1008), the processing flow ends.

In step S1009, the document management application 400 displays a message dialog indicating that an operation set as a button addition target is to be added. An example of the message dialog is as illustrated in FIGS. 7A and 7B.

In step S1010, the document management application 400 determines which of the "yes" button 702 and the "no" button 703 is pressed in the message dialog 700. If it is determined that the "yes" button 702 is pressed (YES in step S1010), the processing proceeds to step S1011. If the "no" button 703 is pressed (NO in step S1010), the processing flow ends.

In step S1011, the document management application 400 adds a button corresponding to an operation selected as a button addition target by a user operation on the message dialog 700. Specifically, the button information tag 802 is added between the current button operation (810) and the button operation (815) immediately before the current button operation (810) in the tab setting information 806. In this example, a button corresponding to the "open" (open document) operation executed at "1/1 10:00:25" is added. Thus, "<Button ID="Button008" Name="Open Document"

Function="open"/>" is added to the tab setting information 806. Then, if the "open document" button is added to the "fax work A" tab, the display screen 500 of the document management application 400 changes from the state in FIG. 5A to the state in FIG. 5B.

This is the button automatic customization determination process. By the process, it is possible to add a button according to the content of an operation of the user, without the intervention of a dedicated dialog for adding a button (FIG. 6).

A second exemplary embodiment will be described below. In the process illustrated in the first exemplary embodiment, as an example, a form has been described in which the "open document" button is added between the "receipt stamp" button and the "transmit fax" button in the "fax work A" tab. However, in a case where also in a tab other than the "fax work A" tab in which the "receipt stamp" button and the "transmit fax" button are successively arranged, there are processes in which the "receipt stamp" button and the "transmit fax" button are arranged, and the user wishes to add the "open document" button between these buttons, the process as illustrated in FIG. 10 needs to be executed with respect to each tab.

In the present exemplary embodiment, a description is given of the process of, in a case where a button is added between certain button operations in a certain tab, determining whether a similar addition process is to be executed also on another tab. The processes described in the above exemplary embodiment are designated by the same numbers, and are not described here.

With reference to FIG. 12, a description is given of a flow regarding automatic customization determination when a button is pressed in the second exemplary embodiment. Similar to FIG. 10, the flow is executed using as a trigger the pressing of a button placed in a tab in the tab list 301 of the document management application 400.

After adding the corresponding button to the tab in step S1011, then in step S1201, the document management application 400 determines whether a tab having a similar button arrangement is present in addition to the tab to which the button is added. In the example illustrated in the first exemplary embodiment, it is determined whether a tab in which the "transmit fax" button is placed immediately after the "receipt stamp" button is present in addition to the "fax work A" tab. If it is determined that a tab having a similar button arrangement is present (YES in step S1201), the processing proceeds to step S1202. If it is determined that a tab having a similar button arrangement is not present (NO in step S1201), the flow ends. The determination in step S1201 is made with reference to the tab setting information 806. It is understood that as illustrated in the tab setting information 806, the "transmit fax" button is placed immediately after the "receipt stamp" button also in the "fax work B" tab.

In step S1202, the document management application 400 displays a message dialog indicating that a button is to be added to the corresponding tab. An example of a message dialog 1100 displayed at this time is illustrated in FIG. 11.

In step S1203, the document management application 400 determines which of a "yes" button 1101 and a "no" button 1102 is pressed in the message dialog 1100. If the "yes" button 1101 is pressed (YES in step S1203), the "open document" button is also inserted between the "receipt stamp" button and the "transmit fax" button in the "fax work B" tab. If the "no" button 1102 is pressed (NO in step S1203), the button is not added to another tab (the "fax work B" tab), and the processing ends.

In step S1204, the document management application 400 also adds the button to the tab identified in step S1201. Specifically, similar to step S1011, the button information tag 802 is also added to the tab setting information 806 regarding the tab identified in step S1201 (the "fax work B" tab). This is the automatic customization determination process according to the present exemplary embodiment.

In a case where a button is added between certain buttons in a certain tab by the process in FIG. 12, a similar addition process is also executed on another tab having a similar button arrangement, whereby it is possible to improve the operability for the user.

The timing when it is determined whether a tab having a similar button arrangement is present in addition to the tab to which the button is added (step S1201) is not limited to the above timing. For example, when the arrangement of the pressed button and the button placed immediately before the pressed button is identified in step S1000, the process of step S1201 may be performed.

A third exemplary embodiment will be described below. In the first and second exemplary embodiments, with reference to FIGS. 10 and 12, forms have been described in which a new button is added using the pressing of a button as a trigger. However, the timing when a new button is added is not limited to this. Specifically, the timing when a new button is added may be after processes corresponding to all the buttons placed in the tab are executed. The timing when a new button is added may be any timing after a process corresponding to the new button is executed. For example, in the case of the "fax work A" tab, a form is possible in which a new button is added at the timing when the "save in transmitted" button placed last in the "fax work A" tab is pressed or the timing when a process corresponding to the "save in transmitted" button ends. At either timing, it does not particularly matter whether the message dialog (FIGS. 7A, 7B, 11, 13A, and 13B) is to be displayed, or a new button is to be added without displaying the message dialog.

Figure 15:
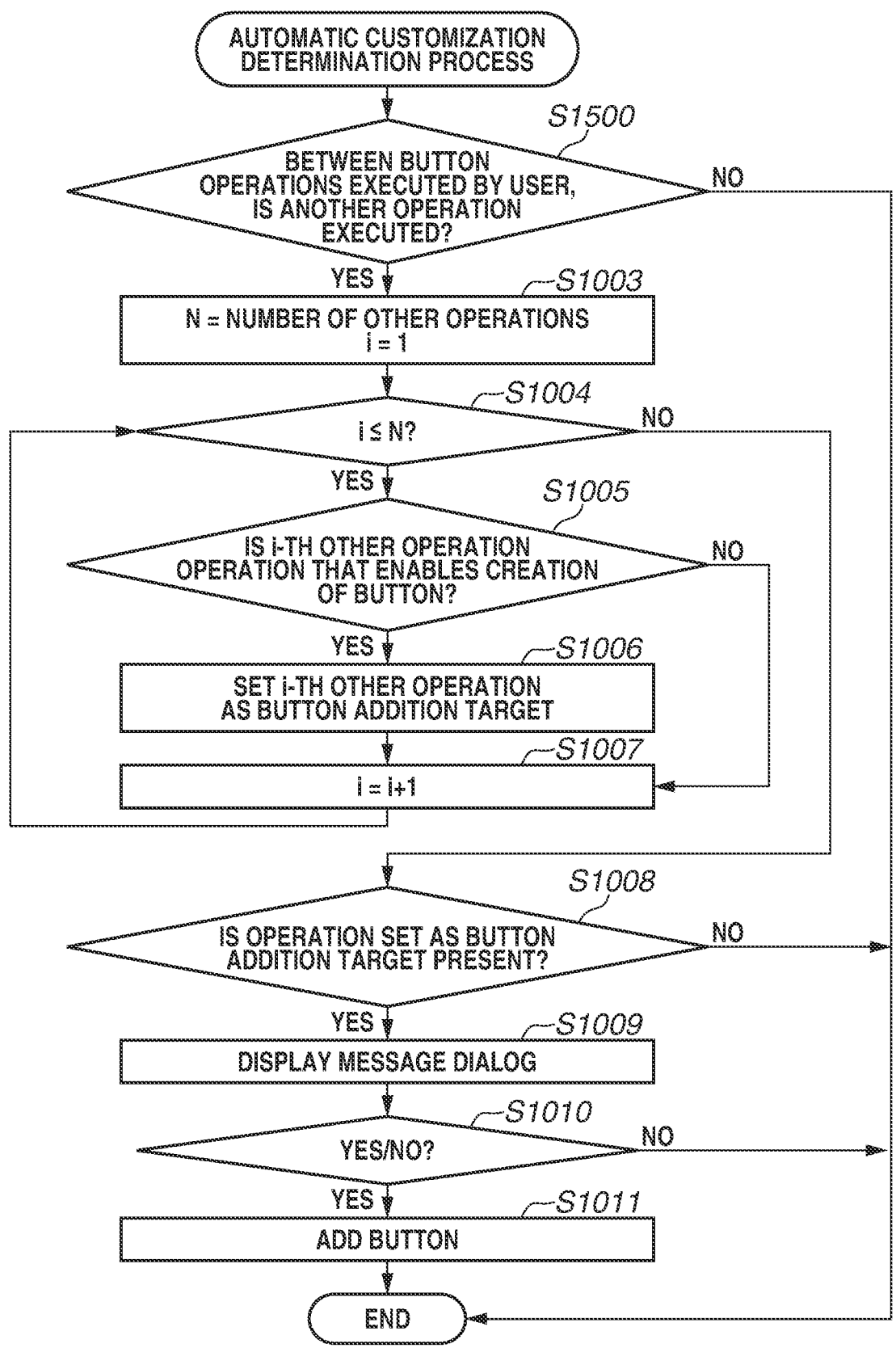
FIG. 15 is a flowchart regarding automatic customization determination according to a third exemplary embodiment.

With reference to FIG. 15, an automatic customization process according to the third exemplary embodiment is described. The processes described above are designated by the same numbers, and are not described here. As described above, the process may be executed using as a trigger the pressing of a button placed immediately after a certain button as illustrated in the first and second exemplary embodiments, or may be executed using as a trigger the end of all processes corresponding to buttons placed in a tab. Since the first case has been described with reference to FIGS. 10 and 12, the second case is described here as an example.

In step S1500, the document management application 400 determines whether between button operations executed by the user, another operation is executed. At this time, the determination is made with reference to operation history information 1600 as illustrated in FIG. 16. Similar to the operation history information 900 (FIG. 9), the operation history information 1600 is information regarding operation histories managed by the document management application 400. From the operation history information 1600, it is understood that all the operations based on the "change name" button, the "receipt stamp" button, the "transmit fax" button, and the "save in transmitted" button placed in the "fax work A" tab are executed, and farther, the "open document" operation, which is not present in the "fax work A" tab, is executed between the "receipt stamp" button and the "transmit fax" button.

Based on the operation history information 1600, in step S1500, it is determined that another operation is executed (YES in step S1500). Thus, the processing proceeds to step S1003. If it is not determined that another operation is executed (NO in step S1500), the processing ends. Similar to step S1002, a criterion for determining whether another operation is executed is not limited to whether a button included in the corresponding tab is pressed.

This is the automatic customization process according to the present exemplary embodiment. The process of step S1500 corresponds to the processes of the steps S1000 to S1002 in the first and second exemplary embodiments.

According to the present exemplary embodiment, without executing a process independent of the execution of a button operation, such as the process of opening the custom setting dialog 600 and adding a button, it is possible to perform a button addition process using as a trigger the execution of an operation other than that based on a button placed in a tab.

Other Embodiments

The first exemplary embodiment is not limited to the form as illustrated in FIG. 10. Alternatively, for example, if the user chooses "not to add the button" once in the processes of steps S1009 and S1010, then even if a corresponding operating procedure is executed after that, the message dialog (FIGS. 7A and 7B) may not be displayed. Furthermore, in view of a case where another operation executed between the current button operation and the button operation immediately before the current button operation is not a routine operation, a form may be employed in which the message dialog (FIGS. 7A and 7B) is displayed only in a case where a corresponding operating procedure is executed multiple times.

Figure 14:
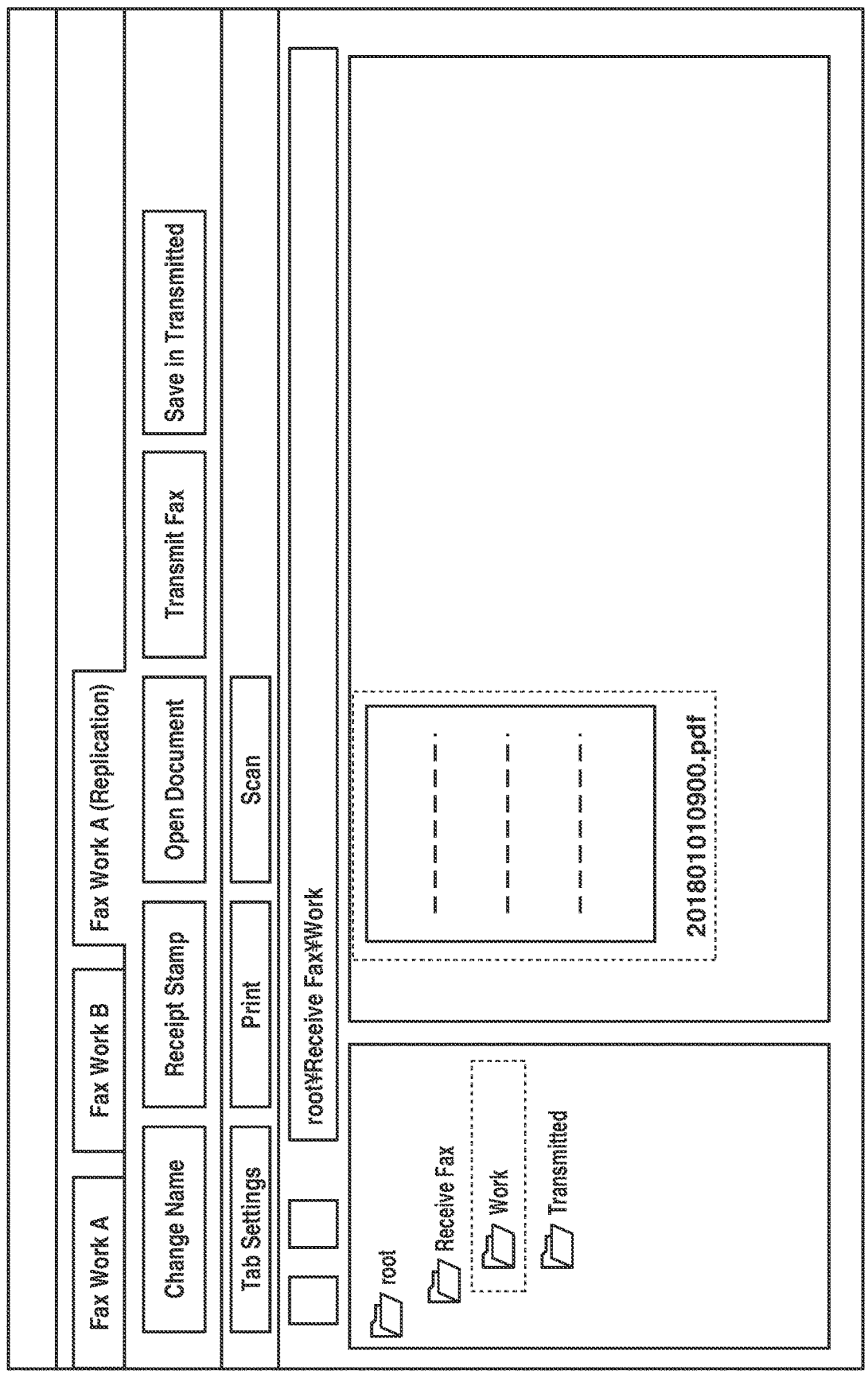
FIG. 14 is an example of a display screen of a document management application.

Further, as another form of the message dialog displayed in step S1009, examples are illustrated in FIGS. 13A and 13B. FIG. 13A illustrates a form in which a replication of the "fax work A" tab is created, and a button (the "open document" button) is added to the replicated tab. FIG. 14 illustrates an example of a display screen when the user selects a "yes" button in the message dialog. In FIG. 14, a "fax work A (replication)" tab, which is a new tab, is created adjacent to the "fax work B" tab. Then, in addition to the four buttons (501) placed in the "fax work A" tab, the "open document" button is added to the "fax work A (replication)" tab. At this time, although not illustrated, buttons placed in the "fax work A" tab" are the same as those in FIG. 5A. The name of the tab to be newly created is not limited to the form in FIG. 14. Alternatively, a form may be employed in which at the timing when the tab is added, the user is allowed to edit the name of the tab.

On the other hand, FIG. 13B is an example of the message dialog when the user is allowed to select whether to add a button to a replicated tab as in FIG. 13A or add a button to an existing tab as in FIGS. 7A and 7B. In the first to third exemplary embodiments, a form has been illustrated in which according to a selection operation of the user in the message dialog (FIGS. 7A, 7B, 11, 13A, and 13B), it is determined whether a button is to be added. The present disclosure, however, is not limited to this. The operation of adding a button may be executed without obtaining the permission of the user in the message dialog.

In the first and second exemplary embodiments, a form has been described in which the function of a button is executed on a single piece of document data (201801010900.pdf). Alternatively, a form may be employed in which a plurality of documents is selected, and the function of a button is executed on the plurality of documents. Further, the processes of a plurality of buttons included in each of the above tab (the "fax work A" tab or the "fax work B" tab) may not necessarily be executed on the same document data. For example, the operation based on the "change name" button in the fax work. A can be executed on document data a, and the operation based on the "receipt stamp" button, which is the next operation, can be executed on document data b. Also in such a case, the above automatic customization process can be executed.

In step S1001 in the first to third exemplary embodiments, when, with reference to the operation history information 900, it is determined whether an operation based on the button placed immediately before the pressed button is executed, the number of items and the period of histories to be referenced may be limited. For example, in a form in which the number of items of histories to be referenced is limited, histories up to five items before the operation based on the pressed button is referenced. Further, in a form in which the period of histories to be referenced is limited, histories up to 30 minutes before the date and time when the button is pressed is referenced. The process of step S1001 may be the process of determining whether an operation based on the button placed immediately before the pressed button is executed within the range of each limitation.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-110454, filed Jun. 8, 2018, which is hereby incorporated by reference herein in its entirety.

What is claimed is:

1. An information processing apparatus comprising:
one or more processors; and
at least one memory storing executable instructions, which when executed by the one or more processors, cause the information processing apparatus to:

display a display area where a plurality of operation buttons corresponding to user operations to be executed on document data is displayed,
the plurality of operation buttons being placed in a tab sheet displayed in the display area according to an order determined in advance, and
the display area being displayed based on a tab of the tab sheet being selected, thereby enabling switching to a state where the plurality of operation buttons is displayed,
wherein in a case where between a timing when a first operation button included in the plurality of operation buttons is selected and a timing when a second operation button included in the plurality of operation buttons is selected, a process, an operation button corresponding to which is not included in the plurality of operation buttons, is executed to the document data by a user operation, a third operation button corresponding to the process executed to the document data is added between the first and second operation buttons in the tab sheet.

2. The information processing apparatus according to claim 1, wherein the instructions, when executed by the one or more processors, further cause the information processing apparatus to:
display a first screen allowing a user to select whether to add the third operation button to the plurality of operation buttons,
wherein in a case where the user makes a selection to add the third operation button on the first screen, the third operation button corresponding to a user operation executed on the document data is added to the plurality of operation buttons.

3. The information processing apparatus according to claim 2, wherein in a case where the user makes a selection not to add the third operation button to the plurality of operation buttons on the first screen, the third operation button is not added.

4. The information processing apparatus according to claim 2, wherein the display area includes:
a first tab sheet in which the plurality of operation buttons is placed; and
a second tab sheet in which a plurality of operation buttons different from the plurality of operation buttons is placed, and
wherein the instructions, when executed by the one or more processors, further cause the information processing apparatus to:
display a second screen allowing the user to select whether to add the third operation button to the plurality of operation buttons placed in the second tab sheet.

5. The information processing apparatus according to claim 4, wherein in a case where a plurality of the another user operations is performed, the first and second screens allow the user to select whether to add some or all of a plurality of the third operation buttons corresponding to the plurality of the another user operations to the plurality of operation buttons.

6. The information processing apparatus according to claim 1, wherein the instructions, when executed by the one or more processors, further cause the information processing apparatus to:
manage as a history an operation button corresponding to a user operation executed on the document data; and
determine whether between the timing when the user operation based on the first operation button is executed and the timing when the user operation based on the second operation button is executed, the another user operation is executed,
wherein based on the history, the determination determines whether the another user operation is executed on the document data.

7. The information processing apparatus according to claim 6, wherein the history includes an operation button corresponding to a user operation executed on the document data, an identifier for distinguishing the operation button corresponding to the executed user operation, and an identifier for distinguishing the tab sheet to which the operation button belongs.

8. The information processing apparatus according to claim 7, wherein the instructions, when executed by the one or more processors, further cause the information processing apparatus to:
determine whether a third tab sheet including the first and second operation buttons is present in addition to a first tab sheet including the first operation button and the second operation button corresponding to the user operation executed according to the order determined in advance and immediately after the user operation based on the first operation button,
wherein in a case where the determination determines that the third tab sheet is present, the third operation button is added between the first and second operation buttons included in the third tab sheet.

9. The information processing apparatus according to claim 1, wherein the instructions, when executed by the one or more processors, further cause the information processing apparatus to:
display the document data with the tab sheet including the plurality of operation buttons.

10. A non-transitory storage medium storing instructions that, when executed by one or more processors of an information processing apparatus, cause the information processing apparatus to:
display a display area where a plurality of operation buttons corresponding to user operations to be executed on document data is displayed,
the plurality of operation buttons being placed in a tab sheet displayed in the display area according to an order determined in advance, and
the display area being displayed based on a tab of the tab sheet being selected, thereby enabling switching to a state where the plurality of operation buttons is displayed,
wherein in a case where between a timing when a first operation button included in the plurality of operation buttons is selected and a timing when a second operation button included in the plurality of operation buttons is selected, a process, an operation button corresponding to which is not included in the plurality of operation buttons, is executed to the document data by a user operation, a third operation button corresponding to the process executed to the document data is added between the first and second operation buttons in the tab sheet.

11. A control method for controlling an information processing apparatus, the control method comprising:
displaying a display area where a plurality of operation buttons corresponding to user operations to be executed on document data is displayed,
the plurality of operation buttons being placed in a tab sheet displayed in the display area according to an order determined in advance, and the display area being displayed based on a tab of the tab sheet being selected, thereby enabling switching to a state where the plurality of operation buttons is displayed; and in a case where between a timing when a first operation button included in the plurality of operation buttons is selected and a timing when a second operation button included in the plurality of operation buttons is selected, a process, an operation button corresponding to which is not included in the plurality of operation buttons, is executed to the document data by a user operation, displaying a third operation button corresponding to the process executed to the document data by adding the third operation button between the first and second operation buttons in the tab sheet.

\* \* \* \* \*